United States Patent Office 3,592,696
Patented July 13, 1971

3,592,696
DIRECT HYDROCARBON FUEL CELL CONTAINING ELECTROLYTE COMPRISING A HALOGENATED ACID AND A LEWIS ACID
Nigel I. Palmer, Port Washington, N.Y., assignor to Leesona Corporation, Warwick, R.I.
No Drawing. Filed Jan. 7, 1969, Ser. No. 789,612
Int. Cl. H01m *11/00, 27/00*
U.S. Cl. 136—86    10 Claims

ABSTRACT OF THE DISCLOSURE

A fuel cell system is described employing a super acid electrolyte. The fuel electrochemically oxidized at the fuel electrode is a carbonaceous material, preferably being a $C_1$–$C_{16}$ alkane. The preferred super acid electrolyte is antimony pentafluoride-fluorosulfonic acid. This fuel cell system provides a rapid and efficient electrochemical conversion of alkanes and the like to their oxidation products.

FIELD OF THE INVENTION

This invention relates to direct hydrocarbon fuel cells, i.e., fuel cells in which the hydrocarbon fuel is employed directly, the oxidation reaction occurring at the fuel electrode. More particularly, this invention concerns a direct hydrocarbon fuel cell in which the electrolyte comprises an unusually strong type of acid medium or super acid. The super acid media of this invention are stronger proton donators than the well-known mineral acids such as hydrofluoric, hydrochloric, phosphoric, chloric, sulfuric, chlorosulfonic, or fluorosulfonic acid. The unusually strong proton-donating tendency of the super acid electrolyte results in more efficient utilization of the hydrocarbon fuel, which can be either liquid or gaseous.

DESCRIPTION OF THE PRIOR ART

Hydrocarbon fuels have long been of interest in fuel cell technology due to their low cost, availability, and adaptability to simple methods of storage. However, the hydrocarbons—particularly the alkanes—are relatively inert as compared to other fuels known to fuel cell technology such as hydrogen, ammonia, and hydrazine. The rate of electrochemical oxidation of hydrocarbons is slow and the activation polarization is extremely high as compared to, for example, hydrogen. Furthermore, the liquid hydrocarbon molecules do not have sufficient polarity to be conveniently used with aqueous electrolytes or other polar electrolyte media. Many of the problems of using hydrocarbon fuel can be avoided by means of external or internal reformation to hydrogen and by-products, but all known reformation processes add to the cost, complexity, and energy losses of a fuel cell system.

Existing direct hydrocarbon fuel cells generally employ electrolytes comprising concentrated aqueous solutions of strong acids such as phosphoric acid or hydrofluoric acid or hydrofluoric acid/cesium fluoride systems. Sulforic acid has also been used, but tends to be degraded by hydrocarbons at operating temperatures above 100° C., which temperatures are generally the most desirable for direct hydrocarbon fuel cells.

OBJECTS OF THE INVENTION

Accordingly, it is an object of this invention to provide a direct hydrocarbon fuel cell system in which the reactivity of the hydrocarbon fuel is greatly increased.
Another object of this invention is to provide a direct hydrocarbon fuel cell system in which the activation polarization is greatly decreased.

A further object of this invention is to provide a fuel cell system in which the electrolyte is a stronger acid than phosphoric acid, hydrofluoric acid, sulfuric acid, or the halosulfonic acids such as fluorosulfonic acid.

A further object of this invention is to provide a direct hydrocarbon fuel cell which can be operated at temperatures above 100° C. without undue risk of corroding the electro-catalysts or other elements employed in the fuel and oxygen electrodes.

A still further object of this invention is to provide a direct hydrocarbon fuel cell employing a polar, acidic electrolyte and a liquid alkane fuel in which the electrolyte is capable of solvating the fuel.

These and other objects will become more apparent from the following detailed description with particular emphasis being placed on the working embodiments.

SUMMARY OF THE INVENTION

The objects of this invention are carried out by providing a fuel cell system in which the electrolyte contacting the fuel and oxygen electrodes comprises a super acid medium. A description of the properties and the molecular structures of various super acids is found in an article by R. J. Gillespie in Accounts of Chemical Research, 1 (7), pages 202–209 (1968). Generally speaking, a super acid is the reaction product of a proton-donating compound and an extremely strong Lewis acid (i.e., an electrophile), this Lewis acid being capable of acidic (electrophilic) activity even in the presence of the proton-donating compound. Examples of proton-donating compounds are hydrofluoric acid, sulfuric acid, chloric acid, chlorosulfonic acid, fluorosulfonic acid, and other well known minearal acids such as hydrochloric acid, hydrobromic acid, phosphoric acid, and the like. All these compounds are strong acids in aqueous media. In non-aqueous acid systems, fluorosulfonic acid appears to be the strongest proton donator. For example, in a sulfuric acid medium, fluorosulfonic acid can ionize to yield a proton and the weakly nucleophilic fluorosulfate ion. Only the extremely strong Lewis acids such as antimony pentafluoride and the like are acidic (electrophilic) with respect to fluorosulfonic acid. Antimony pentafluoride can react with fluorosulfonic acid to yield the fluorosulfate-antimony pentafluoride ion which attracts protons less strongly than the fluorosulfate ion. Thus, the resulting super acid could be represented by the formula $H(SbF_5SO_3F)$. This complex molecule is an exceptionally strong proton donator due to the extremely weak nucleophilic property of antimony pentafluoride-fluorosulfate ion.

The use of super acid media as electrolytes mitigates many of the problems inherent in the direct hydrocarbon fuel cell. The reasons for the improved results are not completely understood, but a possible theoretical explanation is that the normally inactive, neutral hydrocarbon fuel is protonated by the super acid, with the resulting protonated hydrocarbon species being highly reactive. Furthermore, super acid electrolytes have the ability to solvate hydrocarbons such as $C_1$–$C_{16}$ alkanes in the form of surprisingly stable carbonium ions, thus lessening the incompatibility of the polar electrolyte and the non-polar alkanes.

It should be understood that the invention is not intended to be limited by the above theoretical reaction mechanisms and descriptions of super acid molecular structures and properties. Whatever the theoretically correct explanation may be, an increase in the rate of electrochemical reaction at the fuel electrode and a decrease in the activation polarization of the cell is obtained through the use of super acid electrolytes.

Although the super acids are much stronger proton donators than the well-known mineral acids, their corrosive effect has not been found to be significantly greater. As compared to oxidizing acids such as sulfuric acid, a super acid medium is actually less corrosive, thus enabling fuel cells employing super acid electrolytes to be more conveniently operated at elevated temperatures.

DETAILED DESCRIPTION AND EXAMPLES

The existing direct hydrocarbon fuel cell technology is, generally speaking, adaptable to the present invention. For example, the fuel cell described in Giner, application Ser. No. 491,881, filed Sept. 30, 1965, now abandoned, can be modified to provide for a super acid electrolyte. Thus, the fuel electrode of this invention can comprise a porous metal substrate coated with a conductive catalytic layer comprising an admixture of polymer and catalyst. Preferably the catalytic layer will be coated with a hydrophobic polymer layer. The catalyst used in combination with the polymer can be selected from pure elements, alloys, oxides, or mixtures thereof, belonging to Groups I–B, II–B, IV, V, VI, VII, and VIII of the Periodic Table and the rare earth elements. The elements of Group VIII, particularly the second and third triads, have been found to be very effective. Various polymer materials have been successfully used in combination with the electrocatalyst, the preferred polymers being the polyperhaloalkylenes such as polytetrafluoroethylene (PTFE), polychlorotrifluoroethylene, polyvinylidene fluoride, polyvinyl fluoride, and co-polymers thereof.

The oxidant electrode or cathode can be similar to the fuel electrode in structure. A particularly desirable structure comprises a PTFE/catalyst mixture bonded to a PTFE film, the film being on the gas side of the electrode and the polymer/catalyst mixture being in contact with the electrolyte. As in the case of the fuel electrode, the Group VIII elements are effective catalysts. Successful catalysts have also been made from the Group I–B elements.

The structural arrangement of the fuel electrode, oxidant electrode, fuel supplying means, oxidant supplying means exhaust gas means, and the like are well known in the art and will not be described in detail. The electrolyte of this invention is in contact with the fuel and oxidant electrodes in a manner well known in the art. The electrolyte can be a free liquid, can be thickened to form a paste, or can be trapped within the pores of a matrix, the matrix comprising a hydrophilic, corrosion-resistant material such as a glass mat. If desired, the electrolyte can be circulated in a known manner through electrolyte inlet and outlet means.

Any of the carbonaceous fuels known to fuel cell technology can be used in the fuel cell of the present invention. The most advantageous fuels from an economic standpoint are the saturated and unsaturated hydrocarbons, particularly the saturated hydrocarbons, i.e., the alkanes. The preferred alkanes contain from one to 16 carbon atoms and can be straight or branch-chained or cyclic molecules or mixtures thereof. Particularly good results have been obtained with the $C_1$–$C_8$ straight-chain alkanes.

Any of the known oxidizing agents may be employed at the cathode of the fuel cells of this invention. The preferred oxidants are air and oxygen.

The super acid electrolyte media suitable for use in this invention include a class of compounds obtained by reacting a strong proton-donating compound with an extemely strong Lewis acid. The Lewis acid must be a stronger acid than the proton-donating compound, i.e., it must be capable of behaving as an acid in the presence of (even in a medium consisting solely of) the proton-donating compound. In theoretical terms, the Lewis acid must be able to extract a negative ion from a proton-donator molecule, thus causing the proton to be even more available for donation to proton acceptors. The preferred proton donators are compounds which behave as acids even in acid media. Examples of such compounds are fluorosulfonic acid, chlorosulfonic acid, hydrofluoric acid, and the like. Examples of suitable Lewis acids can be represented by the formula $$MY_{5-n}(SO_3X)_n$$

wherein M is arsenic or antimony, X is fluorine or chlorine, Y is halogen, and $n$ represents the numbers 0, 1, 2, or 3. Super acids especially suitable as fuel cell electrolytes have been obtained from the reaction of fluorosulfonic acid, chlorosulfonic acid, hydrofluoric acid, or mixtures thereof, and Lewis acids of the above formula in which $n=0$, i.e., antimony and/or arsenic pentahalides, particularly antimony pentafluoride, antimony pentachloride, arsenic pentafluoride, or mixtures thereof. The preferred super acid is fluorosulfonic acid-antimony pentafluoride, which is operative at temperatures up to 140° C. and is particularly effective in the range of 60° C.–140° C.

The super acid electrolytes of this invention tend to have less corrosive effect upon the fuel and oxidant electrodes than oxidizing acids such as sulfuric acid, even though sulfuric acid is a relatively weak acid by comparison. Unlike sulfuric acid, however, the super acid electrolytes have a tendency to decompose in the presence of water; hence, non-aqueous electrolytes are preferred. Super acids such as fluorosulfonic acid-antimony pentafluoride are liquid in the operating range of the fuel cells of this invention and can be used unmodified as electrolytes. If desired, viscosity modifiers can be added to produce either a paste-like mass or a free-flowing liquid. For example, sulfur dioxide reduces the viscosity of super acids without affecting their acidity.

Although the fuel cells of this invention are preferably operated at 100° C.–140° C., they are operative at temperatures as low as 25° C.

The following examples illustrate the principle and practice of this invention without limiting its scope.

EXAMPLE 1

A methane/oxygen fuel cell having an anode and cathode comprising a 5 mil continuous, unsintered PTFE substrate having a catalyst layer containing 7 mg. platinum and 3 mg. PTFE per cm.² in uniform admixture at one surface and a nickel grid in contact with the catalyst layer was provided with a fluorosulfonic acid-antimony pentafluoride electrolyte. The catalyst layer of the electrodes was in contact with the electrolyte and the PTFE substrate and the outer casing of the cell were arranged to define a fuel compartment and oxidant compartment respectively with an inlet for the fuel or oxidant and an outlet for impurities and the like. The electrolyte completely filled the space between the fuel and oxidant electrodes. The cell was operated at 100° C. The current density in milliamperes per square centimeter was measured at various voltages. The results were as follows:

| Volts: | Current density (ma./cm.²) |
|---|---|
| 0.7 | 20 |
| 0.6 | 40 |
| 0.5 | 60 |
| 0.4 | 65 |

EXAMPLE 2

A fuel cell similar to that of Example 1, with the exception that propane was the fuel, was operated at 140° C. The performance of this cell was as follows:

| Volts: | Current density (ma./cm.²) |
|---|---|
| 0.7 | 20 |
| 0.6 | 50 |
| 0.5 | 80 |
| 0.4 | 100 |

EXAMPLE 3

A fuel cell similar to that of Example 1, with the exception that normal octane was the fuel, was operated at 100° C. The performance of this cell was as follows:

| Volts: | Current density (ma./cm.²) |
|---|---|
| 0.7 | 15 |
| 0.6 | 35 |
| 0.5 | 50 |
| 0.4 | 55 |

The above examples and descriptions are merely illustrative. The persons skilled in the art will understand that various modifications of the invention can be made without departing from its scope. In addition to the Lewis acids designated, other polyhalogenated co-valent compounds such as the halides of tantalum, bismuth, sulfur, aluminum, tellurium, boron, selenium, vanadium, titanium, etc., which behave in a similar manner can be utilized. Additionally, the super acid can be increased in strength by the addition of $SO_3$. The true scope of the present invention is to be determined from the claims which follow.

What is claimed is:

1. A fuel cell comprising a fuel electrode, an oxidant electrode, and an electrolyte in contact with said fuel electrode and said oxidant electrode, the electrolyte comprises a super acid derived from
    a proton-donating compound selected from the group consisting of fluorosulfonic acid, chlorosulfonic acid, hydrofluoric acid, and mixtures thereof, and
    a Lewis acid, said Lewis acid being a polyhalogenated co-valent compound such as the halides of antimony, arsenic, tantalum, bismuth, sulfur, aluminum, tellurium, boron, selenium, and titanium.

2. A fuel cell according to claim 1 wherein the fuel electrode comprises a catalyst comprising a metal of Group VIII of the Periodic Table in combination with a polytetrafluoroethylene matrix.

3. A fuel cell according to claim 1 wherein the oxidant electrode comprises a catalyst selected from the group consisting of a metal of Group VIII and a metal of Group I-B of the Periodic Table, said catalyst being admixed with polytetrafluoroethylene and bonded to a gas-permeable polytetrafluoroethylene film, the catalyst/polytetrafluoroethylene admixture being in contact with the said electrolyte and the said polytetrafluoroethylene film being in contact with the oxidant used at the said oxidant electrode.

4. The fuel cell of claim 1 wherein the strength of the super acid is increased by addition of $SO_3$.

5. The fuel cell of claim 1 wherein the element is antimony.

6. The fuel cell of claim 1 wherein the element is arsenic.

7. The fuel cell of claim 1 wherein the proton donating compound is fluorosulfonic acid and the Lewis acid is antimony pentafluoride.

8. The fuel cell of claim 7 wherein the strength of the super acid is increased by the addition of $SO_3$.

9. The fuel cell of claim 1 wherein the proton donating compound is fluorosulfonic acid and the Lewis acid is arsenic pentafluoride.

10. The fuel cell of claim 9 wherein the strength of the super acid in increased by the addition of $SO_3$.

References Cited

UNITED STATES PATENTS 3,279,949  10/1966  Schaefer et al. _____ 136—86

WINSTON A. DOUGLAS, Primary Examiner

H. A. FEELEY, Assistant Examiner

U.S. Cl. X.R.

136—155